Oct. 29, 1929.  T. BROWN ET AL  1,733,181
DISK PLOW
Filed Jan. 5, 1927
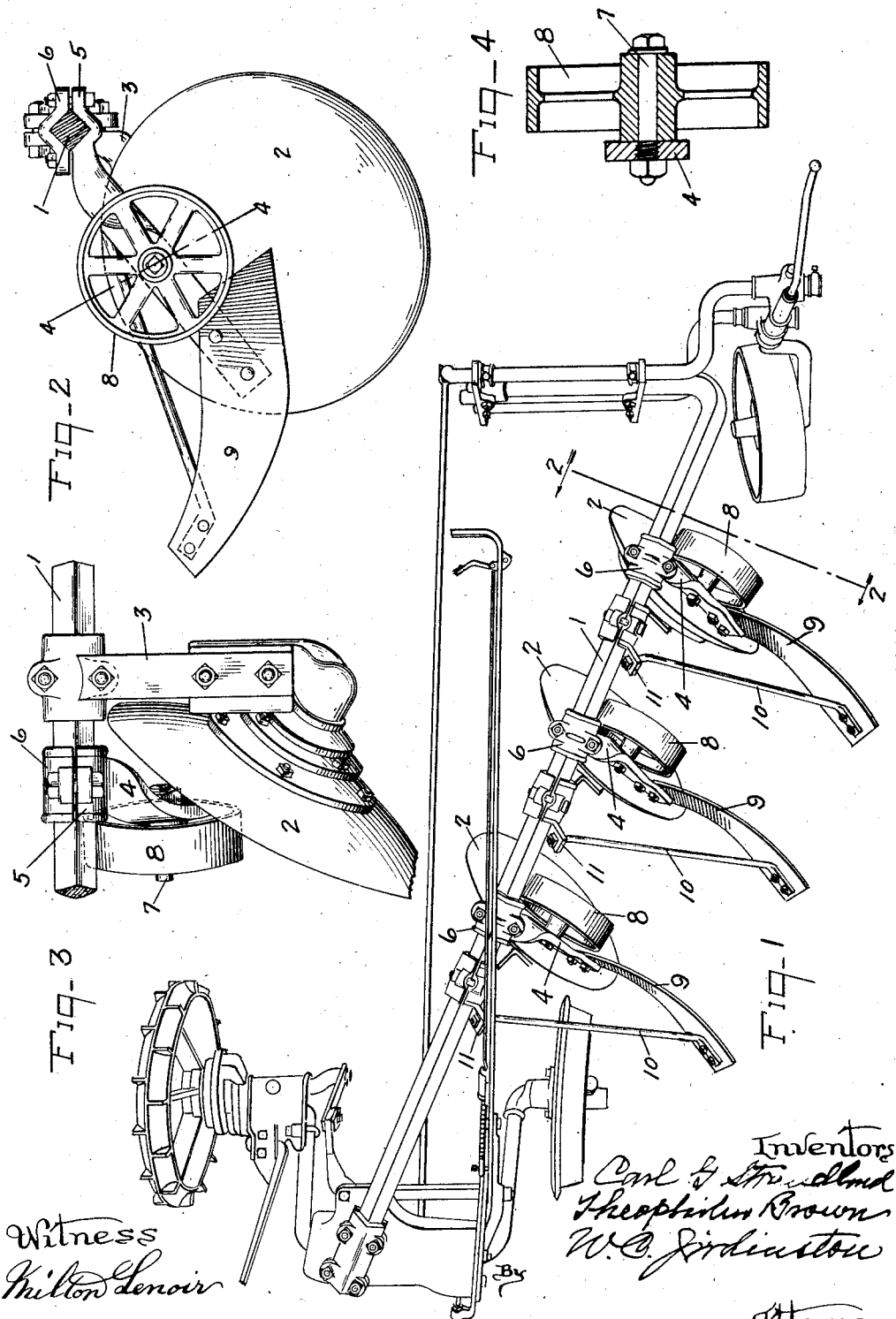

Patented Oct. 29, 1929

1,733,181

UNITED STATES PATENT OFFICE

THEOPHILUS BROWN AND CARL G. STRANDLUND, OF MOLINE, ILLINOIS, ASSIGNORS TO DEERE & COMPANY, OF MOLINE, ILLINOIS, A CORPORATION OF ILLINOIS

DISK PLOW

Application filed January 5, 1927. Serial No. 159,221.

Our invention relates to an attachment for disk plows and more particularly to that type of plow employed in breaking up new land in which the sod is heavy, and with deep and closely matted roots. With ground in such condition, it is extremely difficult to over-turn the sod to bury the surface growth and expose the roots and adhering soil to the disintegrating action of the weather, or the pulverizing effect of implements following the plow to prepare the ground for seeding, in fact the action of the plow, in turning the sod, will be very erratic, making a perfect furrow slice for a short distance while for a further distance the furrow slice will be badly broken, the cut sod breaking and falling landwardly back of the disk, or breaking or sliding over the furrow previously made, and the object of our invention is to provide a device, readily attachable to a disk plow, which will operate upon the sod, as it is cut and raised by the disk, to turn the slice completely over and present a furrow in a most desirable condition.

Referring to the drawings in which similar numerals indicate identical parts:

Figure 1 is a plan view of a disk plow embodying our invention;

Figure 2 is an enlarged detail section on the line 2—2 of Figure 1;

Figure 3 is an enlarged detail view of a disk and our device taken from the landward side, and Figure 4 is an enlarged detail section on the line 4—4 of Figure 2.

The frame of the type of plow shown includes the diagonal beam 1 and front and rear supporting parts on which supporting wheels are mounted. A plurality of plowing disks 2 is mounted on the beam 1, each disk having one of our devices co-operating therewith and mounted on the beam 1. Secured on the beam 1 are standards 3 on the lower ends of which are mounted the disks 2. A gang plow is shown with an attachment for each disk, but as the attachments are similar, it is believed a description of one will suffice. Adjacent each disk, and forwardly thereof on the beam 1, is supported an arm 4, extending downwardly in a furrowward direction and rearwardly toward the disk. The upper ends of the arms 4, formed as the lower parts of clamps 5, fit the underside of the beam 1, and are secured to the upper parts 6 of the clamps, on the upper side of the beam, by suitable bolts.

A bolt 7, secured on the arm 4, intermediate the length thereof, operates as a spindle upon which is mounted a wheel 8 vertically disposed and freely rotatable by contact with the rising slice cut by the disk 2. To the furrowward end of the arm 4 is bolted a moldboard 9 bent to a downward and rearward curve and rigidly held in position by a brace 10 secured to the outer end of the moldboard and extending to a casting 11 on the beam 1 to which it is fastened. The spindle 7 extends forwardly from the arm 4, substantially parallel with the beam 1, and has a slight forward declination so that the wheel 8 is positioned to operate transversely of the disk and the slice cut and turned thereby. The declination of the spindle inclines the wheel so that its axis is at an acute angle to the axis of the disk whereby the tread surface operates upon the upper part of the slice to greater advantage.

As the plow advances, and the slice rises against the disk and is turned by the forward movement thereof, under certain conditions of the soil, the slice is liable to break and fall back of the disk or break and fall upon the slice previously made, and again the slice may be cut and turned and deposited in a perfect manner, for part of its length, upon the slice previously made. To deposit a slice in the desired condition so that it will be uniform, we have constructed our device to be applied to a disk plow, having one or a plurality of plowing disks, and operative on the slice to preserve it in the desired condition and deposit it upon the slice previously made, for as the slice, cut by the disk, rises it contacts with the wheel 8, the latter rotating by the resulting friction and exerting a downward pressure on the slice as it turns by action of the disk 2 and the moldboard 9. Consequently, that part of a slice naturally compacted will turn perfectly, and any part which may be friable will be compressed by the wheel 8 to prevent crumbling, resulting in a uniformity in the turning of slices and their deposit upon the slice previously made. It is possible, however, that the soil may be dry and liable to break in clods and smaller particles and boil up over the disk. In that event, the wheel only can be employed to keep the turning slice down, the moldboard being removed and replaced when desired.

What we claim is—

1. In a disk plow having a frame and a plowing disk supported on the frame, the combination therewith of a freely rotatable wheel supported on the frame forward of the disk operative transversely of the axis of the disk, and a moldboard supported on the frame between said wheel and the disk.

2. In a disk plow having a frame and a plowing disk supported on the frame, the combination therewith of a freely rotatable wheel supported on the frame forward of the disk and above the center thereof operative transversely of the axis of the disk, and a moldboard supported on the frame between said wheel and the disk and extending below the wheel.

3. In a disk plow having a frame and a plowing disk supported thereon, the combination therewith of a freely rotatable wheel supported on the frame forward of the disk and operative transversely of and above the axis of the disk, and a moldboard supported on the frame between said wheel and the disk and extending below the wheel.

4. In a disk plow having a frame and a plowing disk supported on the frame, the combination therewith of a freely rotatable wheel supported on the frame forward of the disk operative transversely of the axis of the disk and inclined downwardly toward the disk, and a moldboard supported on the frame between said wheel and the disk and inclined downwardly toward the disk.

5. In a disk plow having a frame and a plowing disk supported on the frame, the combination therewith of a freely rotatable wheel supported on the frame forward of the disk operative transversely of the axis of the disk and inclined downwardly toward the disk, and a moldboard supported on the frame between said wheel and disk inclined downwardly toward the disk and extending below the wheel.

6. In a disk plow having a frame and a plowing disk supported thereon, the combination therewith of an arm mounted on the frame forward of the disk and extending downwardly in a furrowward direction, a freely rotatable wheel mounted on said arm and operative transversely of the axis of the disk, and a moldboard rigidly mounted on said arm rearward of said wheel.

7. In a disk plow having a frame and a plowing disk supported thereon, the combination therewith of an arm mounted on the frame forward of the disk, a freely rotatable wheel mounted on said arm intermediate the length thereof and operative transversely of and above the axis of said disk, and a moldboard rigidly mounted on said arm below the wheel and between said wheel and the disk.

8. In a disk plow having a frame and a plowing disk supported thereon, the combination therewith of an arm mounted on the frame forward of the disk, a freely rotatable wheel mounted on said arm intermediate the length thereof and operative transversely of and above the axis of said disk and inclined downwardly toward the disk, and a moldboard mounted on said arm below the wheel between the wheel and the disk and extending below said wheel.

9. In a disk plow having a frame and a plowing disk supported thereon, the combination therewith of an arm mounted on the frame forward of the disk and extending downwardly and furrowwardly, a freely rotatable wheel mounted on said arm intermediate the length thereof and inclined downwardly toward the disk, said wheel operative transversely of and above the axis of said disk, and a moldboard rigidly mounted on said arm rearward of and below said wheel and inclined downwardly toward the disk.

10. In a disk plow having a frame and a plowing disk supported thereon, the combination therewith of a freely rotatable wheel supported on the frame and operative transversely of the axis of the disk, a moldboard supported on the frame between said wheel and the disk, and a brace secured to said moldboard and the frame.

11. In a disk plow, the combination of a frame, a plowing disk supported on the frame, a vertically disposed rotatable wheel supported on the frame having its axis at an acute angle to the axis of the disk, said wheel operative transversely and compressively downward on the slice cut and turned by the disk.

12. In a disk plow, the combination of a frame, a plowing disk supported on the frame, a vertically disposed and freely rotatable wheel supported on the frame forward of the disk and above the center thereof and having its axis at an acute angle to the axis of the disk, said wheel operative transversely and compressively downward on the slice cut and turned by the disk.

13. In a disk plow, the combination of a frame, a plowing disk supported on the frame, a vertically disposed wheel supported on the frame and having its axis at an acute angle to the axis of the disk, said wheel rotatable by contact with the slice cut and turned by the disk and operating compressively downward on the slice.

14. In a disk plow, the combination of a frame, a plowing disk supported on the frame, a wheel supported on the frame forwardly of the disk and having its axis at an acute angle to the axis of the disk, said wheel vertically disposed and rotatable transversely of the axis of the disk by contact with the slice cut and turned by the disk and operating compressively on the slice.

15. In a disk plow, the combination of a frame, a plowing disk supported on the frame, a freely rotatable vertically disposed wheel supported on the frame forwardly of the disk and above the center thereof, and having its axis at an acute angle to the axis of the disk, said wheel rotatable by contact with the slice cut and turned by the disk and operating compressively downward on the slice.

THEOPHILUS BROWN.
CARL G. STRANDLUND.